Figure 1:
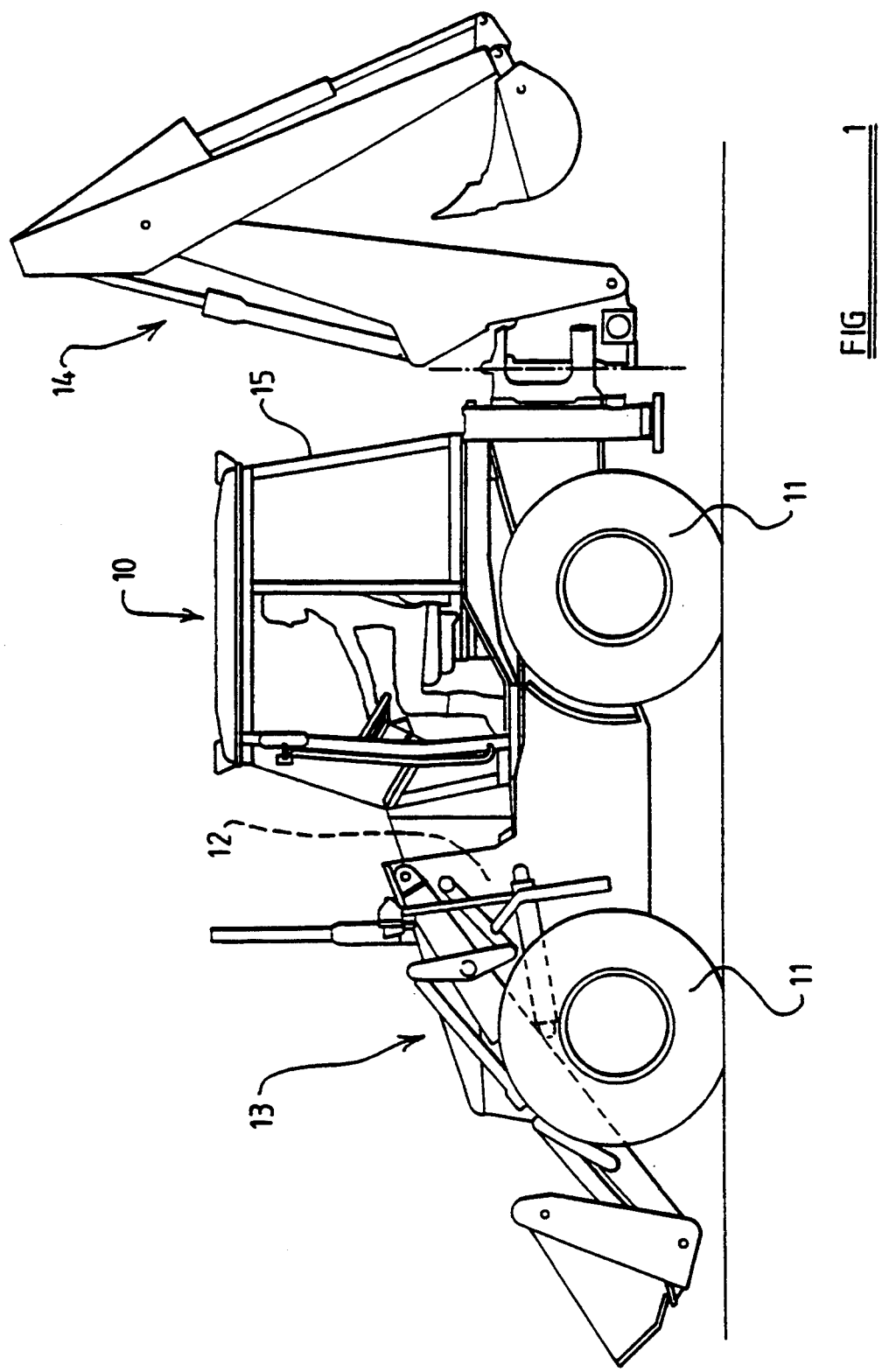

United States Patent [19]
Pendlebury et al.

[11] Patent Number: 5,435,289
[45] Date of Patent: Jul. 25, 1995

[54] INTERCOOLER APPARATUS

[75] Inventors: Robert M. Pendlebury, Derby; Henry N. Shirman, Prestbury, both of United Kingdom

[73] Assignee: J. C. Bamford Excavators Limited, Staffordshire, United Kingdom

[21] Appl. No.: 244,816

[22] PCT Filed: Nov. 1, 1993

[86] PCT No.: PCT/GB93/02237

§ 371 Date: Jul. 1, 1994

§ 102(e) Date: Jul. 1, 1994

[87] PCT Pub. No.: WO94/10433

PCT Pub. Date: May 11, 1994

[30] Foreign Application Priority Data

Nov. 4, 1992 [GB] United Kingdom ............... 9223059

[51] Int. Cl.$^6$ ........................................... F02B 29/04
[52] U.S. Cl. ................................................. 123/563
[58] Field of Search ................... 60/599; 123/542, 563

[56] References Cited

U.S. PATENT DOCUMENTS

| | | | |
|---|---|---|---|
| 3,306,032 | 2/1967 | Chaffiotte | 60/599 |
| 4,237,689 | 12/1980 | Sampietro | 60/599 |
| 4,683,725 | 8/1987 | Sugiura | 123/542 |

FOREIGN PATENT DOCUMENTS

| | | | |
|---|---|---|---|
| 81716 | 6/1983 | European Pat. Off. | 60/599 |
| 54-121325 | 9/1979 | Japan | 60/599 |
| 63-12826 | 1/1988 | Japan | 123/563 |
| 248927 | 3/1948 | Switzerland | 123/563 |
| 1312204 | 5/1987 | U.S.S.R. | 60/599 |

*Primary Examiner*—Michael Koczo
*Attorney, Agent, or Firm*—Plevy and Associates

[57] ABSTRACT

An intercooler apparatus (C) for a supercharged internal combustion engine comprises a heat exchanger (19) through which charged air for combustion passes prior to entry into a combustion chamber (17) of the engine. A refrigeration unit (20) provides the heat exchanger (19) with coolant comprising air cooled to a temperature below ambient temperature which removes heat from the charged air.

12 Claims, 2 Drawing Sheets

INTERCOOLER APPARATUS

DESCRIPTION OF INVENTION

This invention relates to an intercooler apparatus for a supercharged internal combustion engine.

It will be appreciated that in charging air for use in an internal combustion engine, the air becomes compressed and therefore is heated.

Intercoolers are known which cool charged air prior to the charged air entering the combustion chamber of the engine, thus to improve the efficiency of the engine.

Arrangements are known for example from U.S. Pat. No. 4,736,727 in which the charged air for an internal combustion engine of a vehicle is cooled by the action of air at ambient temperature passing a heat exchanger thereof, either as the vehicle moves, or due to the action of a fan. With such an arrangement, the charged air cannot be cooled below the ambient air temperature.

Arrangements are also known, for example from Japanese patent application JP 61037523 in which refrigerant is circulated both to an air conditioning unit and to an air intercooler to cool charged air. This requires an unduly long refrigerant circuit and complicated control mechanisms.

According to one aspect of the invention we provide an intercooler apparatus for a supercharged internal combustion engine comprising a heat exchanger through which charged air for combustion passes prior to entry into a combustion chamber of the engine, and means to provide to the heat exchanger, coolant comprising air cooled to a temperature below ambient temperature which removes heat from the charged air.

The cooled air may be cooled by a refrigeration unit which may be driven from the engine.

For economic reasons, the refrigeration unit preferably is not dedicated solely to the intercooler apparatus, but rather preferably the refrigeration unit is operable otherwise to provide cooling.

For example the internal combustion engine may be controlled from an operator'cab and the refrigeration unit may be operable in addition to providing coolant air to the heat exchanger of the intercooler apparatus, to provide cooled air for the operator's cab.

The cooled air for the intercooler apparatus may be bled from a cooled air feed between the refrigeration unit and the operator's cab or vice versa.

Preferably though the refrigeration unit has a first cooled air outlet connected to the operator's cab and a second cooled air outlet which is connected to the heat exchanger of the intercooler apparatus.

In each case, preferably a control means is provided which is capable of providing for a proportion of, or even all of the air cooled by the refrigeration unit to be fed to the intercooler apparatus.

According to a second aspect of the invention we provide a system comprising an internal combustion engine, a supercharger for charging combustion air for the internal combustion engine, and an intercooler apparatus, the intercooler apparatus comprising a heat exchanger through which charged air for combustion passes prior to entry into the combustion chamber of the engine, a refrigeration unit for providing to the heat exchanger of the intercooler apparatus coolant comprising air cooled to a temperature below ambient temperature, thereby to remove heat from the charged air.

The system may comprise part of a machine such as an excavator and/or loader or crane wherein the engine is operable to provide power for digging and/or loading and/or lifting operations. Alternatively or additionally, the system may comprise part of a vehicle such as a tractor having wheels or tracks or other ground-engaging drive means driven from the engine.

In each case, the refrigeration unit may be operative to provide further cooling for example to cool air for an operator's cab of the machine/vehicle from which the internal combustion engine is controlled.

Figure 2:
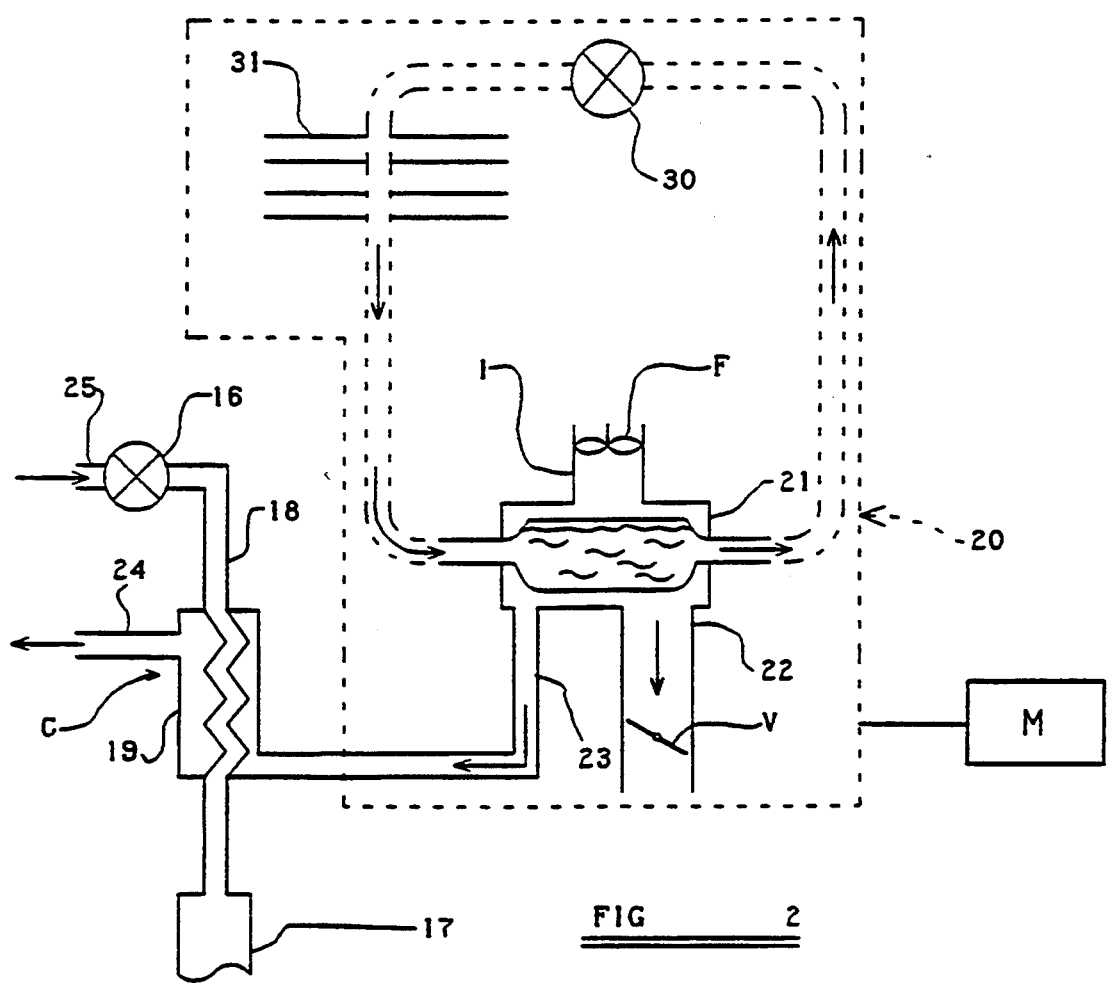

The invention will now be described with reference to the accompanying drawings in which:

FIG. 1 is a side illustrative view of a digging/excavating machine in accordance with the invention, FIG. 2 is an illustrative view of a first embodiment of an intercooler apparatus in accordance with the invention, Referring to FIG. 1, an excavating/loading machine comprises a body 10 mounted on wheels 11, the body 10 housing an engine 12 which provides power to a drive transmission to drive the wheels 11, and to a hydraulic pump for operation of a loading arm 13 and/or an excavating arm 14 mounted on the body 10. Thus the machine can perform loading, digging and lifting operations and be driven over the ground.

The engine 12 (and loading arm 13 and excavating arm 14) are controlled from within an operator's cab 15 which is air conditioned for the comfort of the operator.

The engine 12 is of the supercharged type in which the combustion air, rather than being naturally induced into the engine by the action of pistons in cylinders thereof, is driven into the engine by a supercharging means. The supercharging means may be driven from the exhaust of the engine, or otherwise as desired.

To improve the efficiency of the engine, it is desirable that the charged air is as cool as possible when it enters the combustion chamber of the engine 12.

Referring to FIG. 2, a first embodiment of the invention is illustrated. Air for combustion is charged by a supercharging means 16 and is fed into a combustion chamber 17 of the engine 12 via an air feed 18. The combustion air is warmed by the action of the supercharging means 16 and so, before being fed into the combustion chamber 17, the air passes through a heat exchanger 19 of an intercooler apparatus C, and consequently the charged air gives off heat to the coolant in the heat exchanger 19. The coolant comprises air cooled by a refrigeration unit 20 which is also operable to condition air for the operator's cab 15.

Air at ambient temperature is drawn by a fan F through an inlet I of the refrigeration unit 20 into an evaporator unit 21 and is cooled by refrigerant R passing through the evaporator unit 21. The evaporator unit 21 has a first cooled air outlet 22 which extends to and is connected to the cab 15 whereby cooled air can be directed into the cab 15, and a second cooled air outlet 23 which extends to and is connected to the heat exchanger 19 of the intercooler apparatus C. Air cooled by the refrigeration unit 20 is thus warmed in the heat exchanger 19 by heat absorbed from the charged combustion air, and is then vented to atmosphere via outlet 24 from the heat exchanger 19.

It will be appreciated that refrigerant for the evaporator unit 21 is compressed and condensed by the refrigeration unit 20 by a conventional compression and/or absorption refrigeration process. For example, the refrigeration unit may include a compressor pump 30 and a condenser 31.

Hence air drawn into the evaporator unit 21 through inlet I at ambient temperature will be cooled to below ambient temperature such that the cooled air for the heat exchanger 19 of the intercooler apparatus C is also below ambient temperature. The charged air from the supercharging means 16 will in general have a temperature above ambient temperature by which we mean the temperature at which the combustion air is fed to the charging means 16 through inlet 25.

In a modified arrangement instead of the evaporator unit 21 having first and second separate outlets 22,23 for the cooled air for the cab 15 and/or the heat exchanger 19 of the intercooler apparatus C, a portion of the cooled air can be bled from the cooled air as it is fed to the cab 15 from outlet 22, to the intercooler apparatus C, or vice versa.

In each case, it is preferred that the prime function of the refrigeration unit 20, is to provide cooled air to the intercooler apparatus C, the cab 15 or other cooling being a secondary function. This is to ensure that engine performance is maintained. Thus in the event that there is any competition for cooled air, the refrigeration unit 20 may be arranged to provide up to its entire capacity of cooled air for use in the intercooler apparatus C, and a restricted supply of cooled air or no cooled air at all, for use in cooling the cab 15.

In the arrangement shown in FIG. 2, this may be achieved by providing in at least outlet 22 from the evaporator 21, a butterfly or other kind of valve V which can be closed to varying degrees to permit a greater proportion, or even all of the air cooled in the refrigeration unit 20 to be available for the intercooler apparatus C.

In an alternative arrangement in which the evaporator 21 has a single outlet with a branch to enable the bleeding of cooled air to the intercooler apparatus C or the cab 15, a similar butterfly valve arrangement may be provided between the bleed connection and the cab 15.

In each case, it is envisaged that in normal operation of the engine 12, cooled air would be shared between the intercooler apparatus C and the cab 15, but in the event that enhanced engine performance is required, for example so that a difficult digging or excavating operation can more easily be performed, the operator can operate a control of a control means so that the butterfly valve V would be closed, and all of the cooled air provided by the refrigeration unit 20 would become available to the intercooler apparatus C.

Of course, during such an operation, cooled air would not be available for the cab 15.

In a modified arrangement, if desired, the outlet 23 from the refrigeration unit 20 may additionally have a butterfly or other valve if required, under the control of a control means, such as for example only, an electronic engine management system M so as to enable fine control over the amount of cooled air fed to the intercooler apparatus C.

The control means M may otherwise be operable for controlling the refrigeration unit 10.

Preferably though, the intercooler apparatus C need not comprise any separate control means to control the degree of cooling of the charged air, but the degree of cooling of the charged air is controlled solely as a result of the usual controls provided for the refrigeration unit 20 from which cooled air is obtained.

Various modifications may be made to the invention. For example, although in the embodiments described, cooled air for the heat exchanger 19 for the intercooler apparatus C is obtained from a refrigeration unit 20 which is also operable to condition air for the cab 15, cooled air may be obtained from a refrigeration unit 20 which is operable otherwise to provide cooling. For example, where the invention is applied to a vehicle rather than an excavating and/or loading machine 10 as described, the refrigeration unit 20 from which cooled air is obtained for the intercooler apparatus C, may be operable to provide refrigeration in a goods storage space.

If desired, in addition to a refrigeration unit 20, to provide cooled air to the intercooler apparatus C, means may be provided to supply air at ambient temperature to the intercooler apparatus C, or additional intercooler means, at least partially to cool the supercharged air towards the temperature of the ambient air. The air at ambient temperature may be arranged to be fed to the intercooler apparatus C or to the additional intercooler means when cooled air is not being supplied thereto from the refrigeration unit 20, or at the same time, the air at ambient temperature partially cooling the supercharged air before this is cooled by the cooled air from the refrigeration unit 20.

The features disclosed in the foregoing description the following claims or the accompanying drawings, expressed in their specific forms or in terms of a means for performing the disclosed function, or a method or process for attaining the disclosed result, or a class or group of substances or compositions, as appropriate, may, separately or in any combination of such features, be utilised for realising the invention in diverse forms thereof.

We claim:

1. An intercooler apparatus for a supercharged internal combustion engine having a combustion chamber, comprises a heat exchanger, means to pass charged air for combustion through the heat exchanger, prior to entry into the combustion chamber of the engine, and means to provide to the heat exchanger coolant wherein the coolant comprises air cooled to a temperature below ambient temperature which cooled air removes heat from the charged air.

2. An apparatus according to claim 1 wherein the cooled air is cooled by a refrigeration unit.

3. An apparatus according to claim 2 wherein the refrigeration unit is driven from the engine.

4. An apparatus according to claim 2 wherein the refrigeration unit is operable otherwise to provide cooling.

5. An apparatus according to claim 4 wherein the internal combustion engine is controlled from an operator's cab and the refrigation unit is operable to provide cooled air for the operator's cab.

6. An apparatus according to claim 5 wherein the cooled air for the intercooler apparatus is bled from an air feed between the refrigeration unit and the operator's cab or vice versa.

7. An apparatus according to claim 5 wherein the refrigeration unit has a first cooled air outlet connected to the operator's cab and a second cooled air outlet which is connected to the heat exchanger of the intercooler apparatus.

8. An apparatus according to claim 5 wherein a control means is provided which is capable of providing for at least a proportion of the air cooled by the refrigeration unit to be fed to the intercooler appparatus.

9. A system comprising an internal combustion engine having a combustion chamber, a supercharger for charging combustion air for the internal combustion engine, and an intercooler apparatus, the intercooler apparatus comprising a heat exchanger and means to pass charged air for combustion through the heat exchanger prior to entry into the combustion chamber of the engine wherein there is provided a refrigeration unit for providing to the heat exchanger of the intercooler apparatus air at a temperature below ambient temperature, thereby to remove heat from the charged air.

10. A system according to claim 9 which comprises part of an excavating and/or loading machine wherein the engine is operable to provide power for digging and/or loading and/or lifting operations.

11. A system according to claim 10 which comprises part of a vehicle and a machine, having ground-engaging drive means driven from the engine.

12. An apparatus according to claim 5 wherein the cooled air for the operator's cab is bled from an air feed between the refrigeration unit and the intercooler apparatus.

* * * * *